United States Patent
Nakane

(10) Patent No.: US 7,558,456 B2
(45) Date of Patent: Jul. 7, 2009

(54) OPTICAL WAVEGUIDE DEVICE

(75) Inventor: Taketomo Nakane, Tama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 12/076,976

(22) Filed: Mar. 26, 2008

(65) Prior Publication Data

US 2008/0199136 A1    Aug. 21, 2008

Related U.S. Application Data

(63) Continuation of application No. PCT/JP2006/312433, filed on Jun. 21, 2006.

(30) Foreign Application Priority Data

Sep. 30, 2005   (JP) .............................. 2005-289099

(51) Int. Cl.
- G02F 1/035 (2006.01)
- G02B 6/12 (2006.01)
- G02B 6/26 (2006.01)
- G02B 6/28 (2006.01)
- G02B 6/34 (2006.01)
- G02B 6/42 (2006.01)
- G02B 6/02 (2006.01)
- G02B 6/10 (2006.01)
- G02B 6/00 (2006.01)

(52) U.S. Cl. .............................. 385/126; 385/2; 385/3; 385/14; 385/16; 385/24; 385/37; 385/39; 385/40; 385/45; 385/123; 385/124; 385/127; 385/128; 385/129; 385/130; 385/131; 385/132; 385/141

(58) Field of Classification Search .................... 385/2, 385/3, 14, 16, 24, 37, 39, 40, 45, 123, 124, 385/126–132, 141
See application file for complete search history.

(56) References Cited

U.S. PATENT DOCUMENTS

| 2004/0151460 | A1   | 8/2004 | Kitcher et al. |
| 2005/0207705 | A1 * | 9/2005 | Laurent-Lund ............... 385/45 |
| 2006/0165348 | A1 * | 7/2006 | Iio et al. ......................... 385/16 |

FOREIGN PATENT DOCUMENTS

| EP | 0883000 | 12/1998 |
| JP | 1-097907 | 4/1989 |
| JP | 3-265802 | 11/1991 |
| JP | 07-092338 | 4/1995 |
| JP | 9-005548 | 1/1997 |
| JP | 9-230155 | 9/1997 |
| JP | 2000-147293 | 5/2000 |
| JP | 2003-222747 | 8/2003 |
| JP | 2004264631 A * | 9/2004 |
| WO | WO 02/097491 | 12/2002 |

* cited by examiner

*Primary Examiner*—Brian M. Healy
*Assistant Examiner*—Hung Lam
(74) *Attorney, Agent, or Firm*—IPUSA, PLLC

(57) ABSTRACT

An optical waveguide device includes a lower cladding layer, a high refractive index region provided on the lower cladding layer, a pair of cores provided on the lower cladding layer on both sides of the high refractive index region, and an upper cladding layer provided on the high refractive index region and the pair of cores. One of the upper and lower cladding layers has a pair of band-shaped parts disposed between the high refractive index region and the pair of cores.

8 Claims, 14 Drawing Sheets

FIG.7
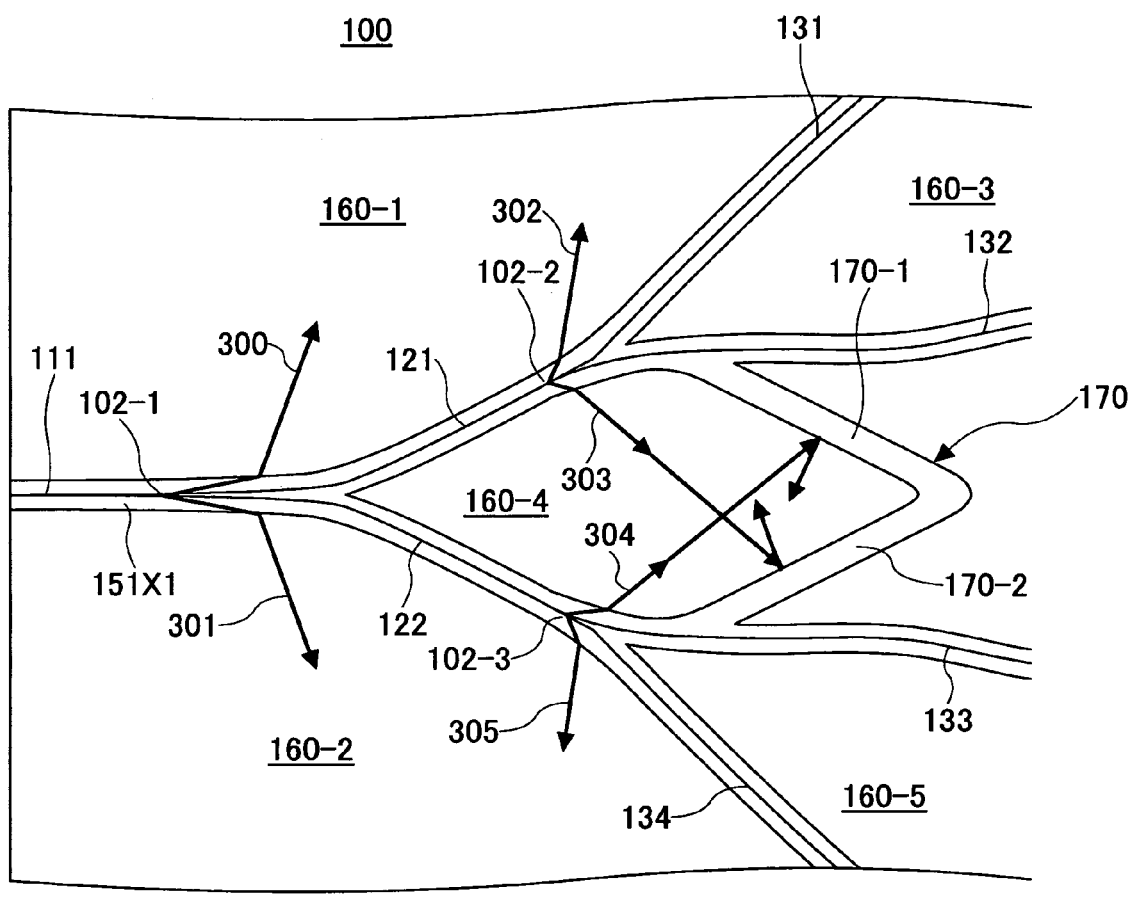
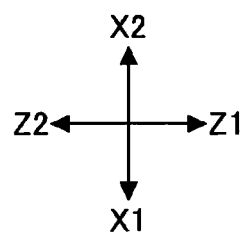

OPTICAL WAVEGUIDE DEVICE

CROSS-REFERENCE TO RELATED APPLICATIONS

This application is a continuation application filed under 35 U.S.C. 111(a) claiming the benefit under 35 U.S.C 120 and 365(c) of a PCT International Application No. PCT/JP2006/312433 filed Jun. 21, 2006, in the Japanese Patent Office, the disclosure of which is hereby incorporated by reference.

BACKGROUND OF THE INVENTION

1. Field of the Invention

The present invention relates to an optical waveguide device.

2. Description of the Related Art

A branch optical waveguide device, having branch optical waveguide structures made of polymer materials, has advantages for providing significantly high productivity and low manufacturing costs, and, thus, such branch optical waveguide devices are used for component parts to fabricate optical modules.

In an optical communication network system based on optical fiber technology, optical fibers are installed from a station to individual homes. In the system, an optical fiber from the station is connected to a splitter module that has plural output ports. The ports connect plural optical fibers that are respectively delivered to individual homes. The optical signal communication provides two-way (bidirection) communication, where optical signals are delivered not only from the station, but from the individual homes.

The optical waveguide device is incorporated in the splitter module. Optical losses at ports of the module are required to be as uniform as possible. In general, infrared light having a wavelength of 1550 nm is used as the optical signal that is sent from the station to individual homes. An infrared light having a wavelength of 1310 nm is used as the optical signal that is sent from individual homes to the station. In actual communication, the optical signal is subjected to DWDM (Dense Wavelength Division Multiplexing), and infrared light having a predetermined bandwidth is used for the communication. Thus, a branch optical waveguide device is required to have a uniformity of optical losses for the predetermined bandwidth over all the ports. It will be required for the optical losses over all the ports to be more uniform in the future, because the communication band becomes wider in range with increases in picture delivery communications.

FIG. 11 is a plan view of a conventional 8-branch optical waveguide device 1.

As shown in FIG. 11, the 8-branch optical waveguide device 1 includes 8 ports P1 through P8, and incident light to a port Q propagates within a core pattern 10 and splits into 8 parts to send it out from the ports P1 through P8. The core pattern 10 includes seven branch points 12-1 through 12-7, a junction side core 11, the first stage branch side cores 21 and 22, the second stage branch side cores 31, 32, 33 and 34, and the fourth stage branch side cores 41 through 48. The core pattern 10 is formed to be axially symmetric at the center line CL drawn through the port Q.

When an optical signal is sent from a station to a home, the optical signal is incident to the port Q, propagates the junction side core 11, is divided at the branch points, and goes out through the ports P1 through P8.

FIG. 12 is an enlarged cross-sectional view of the optical waveguide device at the line A-A in FIG. 11 viewing along the arrows A.

As shown in FIG. 12, the 8-branch optical waveguide device 1 has an 8-branch optical waveguide provided on a semiconductor substrate 2. The 8-branch optical waveguide device is constructed on the silicon substrate 2 and includes a lower cladding layer 5 which is formed on the silicon substrate 2, the core pattern 10 which is formed on the lower cladding layer 5 (the second stage branch side cores 31, 32, 33 and 34 are indicated in the figure), and an upper cladding layer 6 which is formed on the lower cladding layer 5 and covers the core pattern 10.

FIG. 13 and FIG. 14 show simulation results of optical loss characteristics of a conventional 8-branch optical waveguide device.

FIG. 13 shows wavelength dependence on optical losses at ports P1 through P4.

Specifically, the lines LP1 through LP4 indicate the losses as a function of the wavelength at the ports P1 through P4. Further the losses at P5 through P8 are the almost similar to those of the ports P1 through P4.

In an ideal case, the optical loss for each port of the 8-branch optical waveguide device 1 is desired to be a constant amount, such as 9 dB, even for different wavelengths of incident lights. On the other hand, in practical cases, as shown in FIG. 13, the optical losses change as a function of wavelength of the incident light. Further, individual ports show different wavelength dependences of the optical losses between the ports.

FIG. 14 shows wavelength dependences on optical loss by branching and non-uniformity of optical loss at different ports.

In FIG. 14, solid square shapes indicate wavelength dependence of non-uniformity of optical loss at a port, and solid diamond shapes indicate wavelength dependence of the branching loss.

The non-uniformity of loss at a port is expressed by a differential between the maximum loss and the minimum loss at the predetermined port.

As shown in FIG. 14, the differential port loss changes, ranging from about 0.05 dB to about 0.4 dB, and at a wavelength of around 1450 nm, the differential port loss becomes larger, being 0.37 dB.

The reason for the non-uniformity of port loss is unclear. Optical signal (light) incident to the port Q (input port) propagates in the core pattern 10 with meandering for several reasons. It may be regarded that this meandering of light causes non-uniform light splitting at a branch point, so that the non-uniformity of optical loss takes place at the ports. In addition, it may be regarded that leaking light at the branch points 12-1 through 12-7 can be one of the reasons for the non-uniformity of branching loss.

As described above, the conventional optical waveguide device shows non-uniform port loss for a predetermined bandwidth, and the conventional waveguide device does not sufficiently meet the requirement for uniformity of optical loss over a wide range of wavelengths.

Reference 1: Japanese Patent Application Publication No. 7-92338

SUMMARY OF THE INVENTION

According to one aspect of the present invention, an optical waveguide device is provided for improving the uniformity of optical losses at output ports of the optical waveguide device.

In order to suppress the problem described above, an the optical waveguide device includes an optical waveguide formed on a substrate, having a cladding layer that includes a band-shaped part and covers a core along the core, and a high refractive index region, having a high refractive index that is higher than a refractive index of the cladding layer, the high refractive index region being located outside of the cladding layer.

BRIEF DESCRIPTION OF THE DRAWINGS

FIG. 7 is an illustrative drawing for explaining an effect on a leak light blocking band;

DETAILED DESCRIPTION OF THE PREFERRED EMBODIMENTS

First Embodiment

By referring to the figures, the embodiments related to the present invention are explained in the following.

An 8-branch optical waveguide device 100, in a first embodiment of the present invention, is shown in FIG. 1 through FIG. 4.

Figure 1:
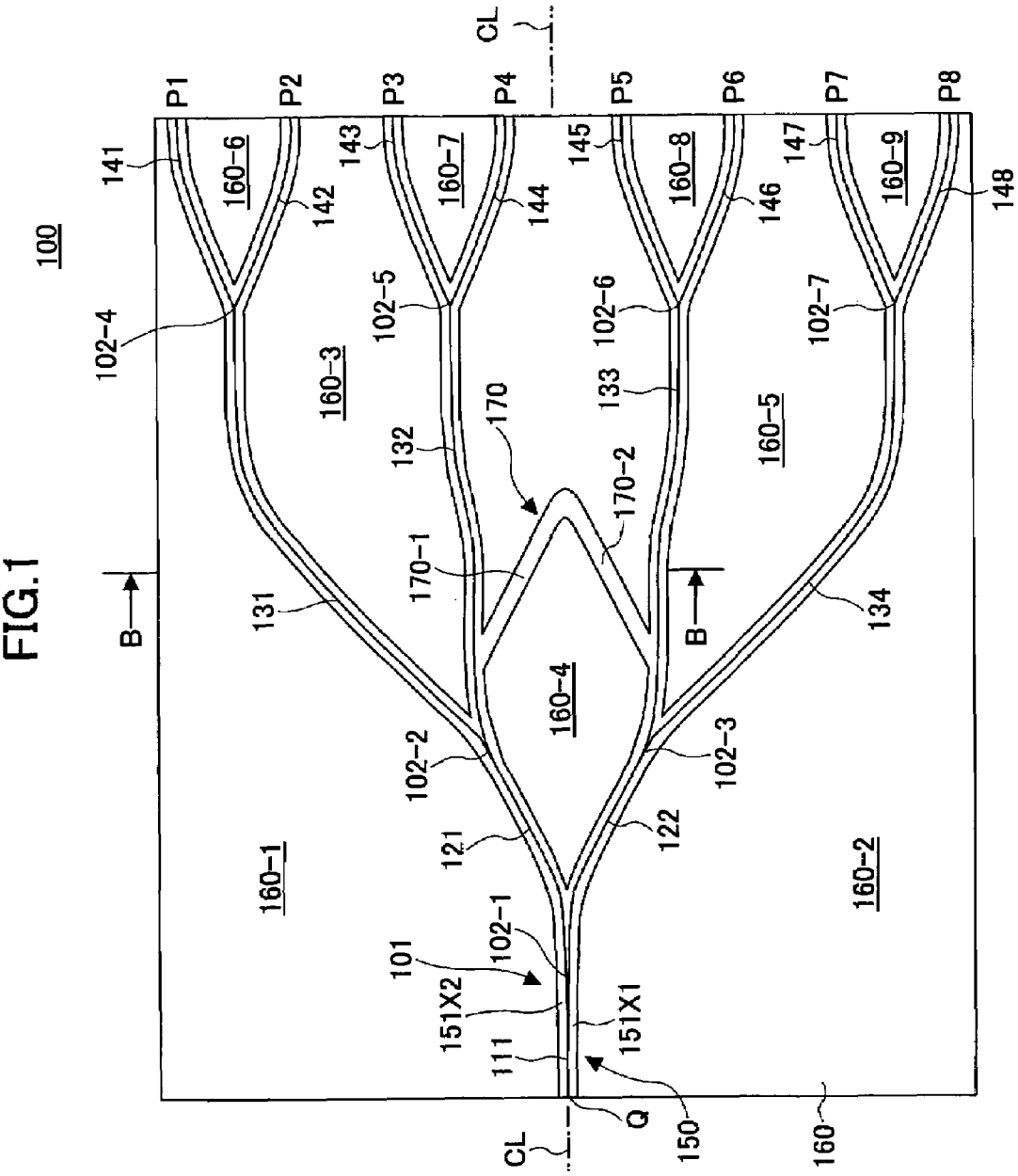
FIG. 1 is a plan view of an 8-branch optical waveguide device related to an embodiment of the present invention.

FIG. 1 is a plan view of the 8-branch optical device 100 related to the first embodiment of the present invention.

Figure 2:
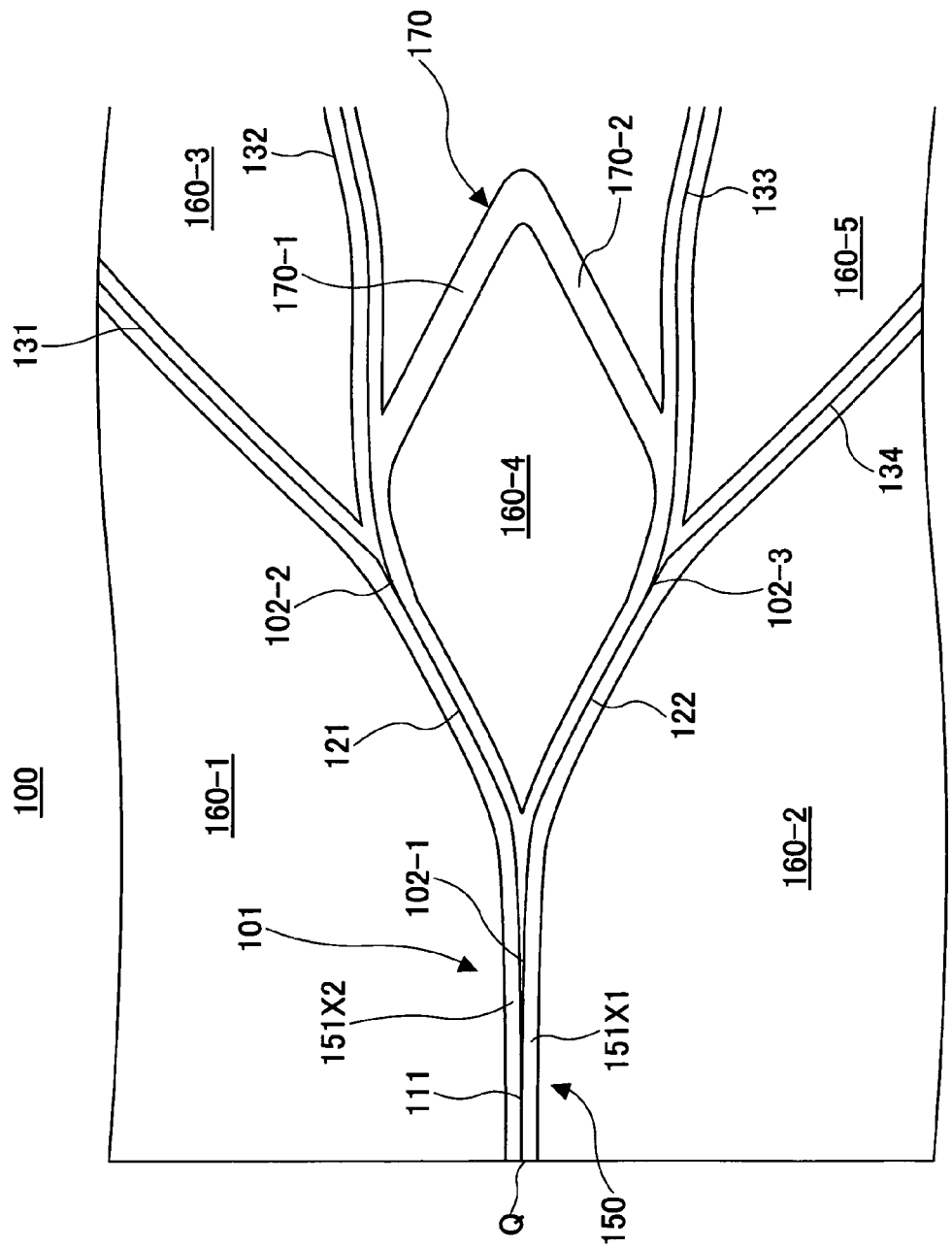
FIG. 2 is a partially enlarged plan view of the 8-branch optical waveguide device of FIG. 1.

FIG. 2 shows an enlarged plan view of a part of the 8-branch optical waveguide device.

As shown in FIG. 1 and FIG. 2, the 8-branch optical waveguide device has eight ports P1 through P8. Incident light to the port Q propagates in a core pattern 101 and is split into the eight branches, and then the split light is output from each of the ports P1 through P8. The core pattern 101 includes seven branch points 102-1 through 102-7, a junction side core 111, first stage branch side cores 121 and 122, second stage junction side cores 131, 132, 133, 134, and fourth stage branch side cores 141 through 148. The core pattern 101 is symmetrical about a center line CL passing through the port Q. The seven branch points are labeled as a first stage branch point 102-1, second stage branch points 102-2 and 102-3, and fourth stage branch points 102-4 through 102-7 from the port Q toward the ports P1 through P8.

Further, the 8-branch optical waveguide device 100 includes the junction side core 111, the first stage branch side cores 121 and 122, the second stage branch side cores 131, 132, 133 and 134, and a high refractive index region 160 located between and outside of the fourth stage branch side cores 141 through 148. The high refractive index region 160 is divided into nine high refractive index regions by each stage of the core pattern 101.

An upper cladding layer 150 having a refractive index n2 (second refractive index n2) is formed along the junction side core 111 of the core pattern 101, the first stage branch side cores 121 and 122, the second stage branch side cores 131 through 134, and the fourth stage branch side cores 141 through 148. As shown in the plan view of FIG. 1, the upper cladding layer 150 includes band-shaped parts 150X1 and 150X2. In FIG. 1, only the upper cladding layer 150 on the junction side core 111 is shown.

Figure 3:
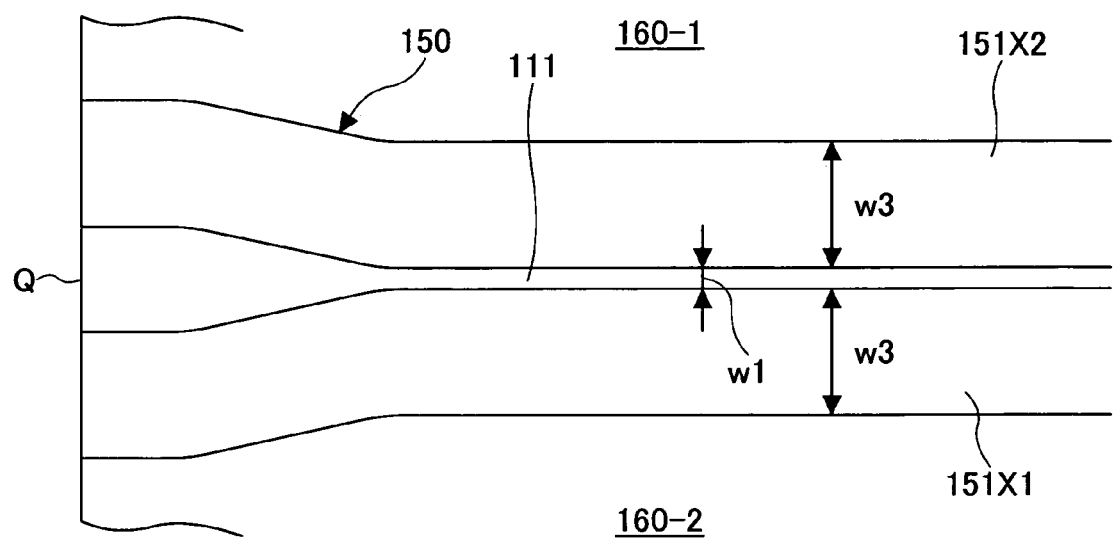
FIG. 3 is a partially enlarged plan view of an input port and a junction-side core.

FIG. 3 shows a further enlarged plan view around the port Q.

As shown in FIG. 3, the upper cladding layer 150 is provided along the junction side core 111 of the core pattern 101, and the upper cladding layer 150 is formed of two parts, 150X1 and 150X2. The width of the junction side core 111 is indicated to be W1, and W3 is the width for each 150X1 and 150X2 that are parts of the junction side core 111.

Figure 4:
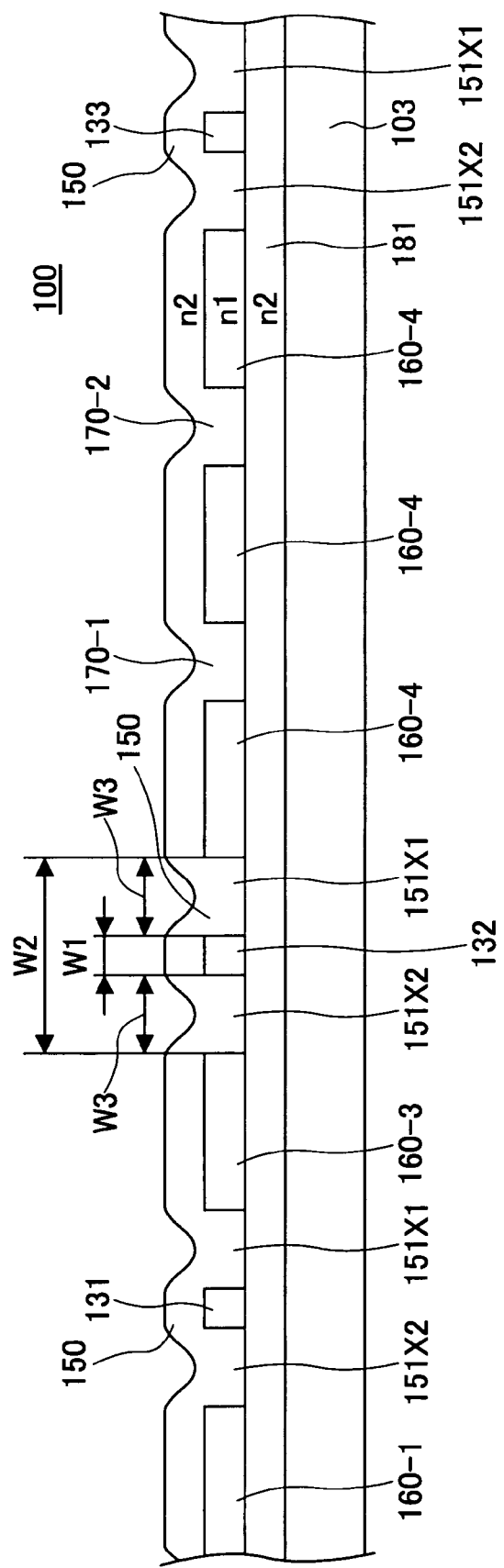
FIG. 4 is an enlarged cross-sectional view at the line B-B of FIG. 1.

FIG. 4 shows an enlarged cross-sectional view of the 8-branch optical waveguide device at the line B-B in FIG. 1 viewing along the arrows A.

As shown in FIG. 4, the 8-branch optical waveguide device 100 is provided with an 8-branch optical waveguide on a silicon substrate 103. The 8-branch optical waveguide device 100 includes a silicon substrate 103, a lower cladding layer 181 formed on the silicon substrate 103, a core pattern 101 (as parts of the core pattern 101, second stage branch side cores 131, 132, 133 and 134 are shown in the figure) formed on the lower cladding layer 181, an upper cladding layer 150 formed along the core pattern 101, high refractive index regions 160-1 through 160-9 formed outside and inside areas that are defined by the upper cladding layers 150, and a leak light blocking band 170 formed in the high refractive index regions.

Further, the upper cladding layer 150 has parts 151X1 and 151X2 which are provided on both sides of the core 131 and extend along the core 131. The upper and lower cladding layers 150 and 181 make contact with upper and lower surfaces of the core 131, respectively. The band-shaped parts 151X1 and 151X2 make contact with side surfaces of the core 131. Accordingly, the core 131 is surrounded by the upper and lower cladding layers 150 and 181, including the band-shaped parts 151X1 and 151X2, along the direction in which the core 131 extends.

Alternatively, the band-shaped parts 151X1 and 151X2 may be formed by the lower cladding layer 181, instead of being formed by the upper cladding layer 150.

The high refractive index region 160-1 has a refractive index n3 (a third refractive index n3) which is higher than a refractive index n2 (a second refractive index n2) of the upper and lower cladding layers 150 and 181, and the refractive index n3 is higher than or equal to a refractive index n1 (a first refractive index n1) of the core 131, that is, $n3 \geq n1 > n2$. The high refractive index region 160-1 may be made of the same material as the core 131 or, may be made of a material different from the material of the core 131, provided that the relationship $n3 \geq n1 > n2$ is satisfied.

More particularly, the line width W1 of the junction side core 111 and each of the branch side cores 121, 122, 131 through 134, and 141 through 148 is formed to be about 5 μm. For example, the core pattern 101 is made of a polymer material, such as a fluorinated polyimide resin, and a refractive index of the core pattern 101 is denoted by n1.

The upper cladding layer 150 includes a band-shaped part and a line width W2 that is wider than the width of cores 111 through 148. The upper cladding layer 150 covers the junction side core 111 and the branch side cores 121, 122, 131 through 134, and 141 through 148, and is laid along the junction side core 111 and the branch side cores 121, 122, 131 through 134, and 141 through 148. For example, the upper cladding layer 150 is formed with a polymer material, such as a fluorinated polyimide resin with a refractive index n2 (>n1).

For the upper cladding layer 150, a band-shaped part 151X1 is formed along one side of the cores 111, 121, 122, 131 through 134, and 141 through 148, and a band-shaped part 151X2 is formed along another side of the core 111, 121, 122, 131 through 134, and 141 through 148. The line widths W3 of the band-shaped parts 151X1 and 151X2 are formed to be approximately 2 μm to approximately 30 μm.

The high refractive index regions 160-1 through 160-9 are formed to occupy the rest of the device areas excluding the core pattern 101 and the upper cladding layer 150. The core pattern 101 and the upper cladding layer 150 divide the high refractive index regions into 9 parts, 160-1 through 160-9.

In the following, the plan views of FIG. 1 and FIG. 2 are used to identify the portion of a leak light blocking band 170.

Referring to FIG. 1, from the input port (port Q) to the output ports, P1 through P8, a pair of cores is formed after each branch point. The pair of cores is adjacent.

There are three branch stages in the core pattern in FIG. 1, each stage is identified as a first stage, a second stage and a fourth stage from the input port Q to the output ports P1 through P8. A leak light blocking band 170 is provided across the high refractive index region 160-4, where the leak light blocking band 170 is connected to each cladding layer of a pair of the adjacent cores 132 and 133 as shown in FIG. 1. The leak light blocking band 170 may be formed having an approximate V-shape which opens toward the input port Q, as shown in the plan view of FIG. 1.

The leak light blocking band 170 is made of a polyimide material such as a fluorinated polyimide resin, the same material as the upper cladding layer 150 with a refractive index n2 (<n1).

In the following, the function and characteristics of the 8-branch optical waveguide device 100 are described for a case where an optical signal is sent from a station to a home.

As described above, for the conventional optical waveguide device, light incident to the port Q, propagating in the core pattern, is split into two parts at each branch point and output through the output ports P1 through P8, where the light propagates in the core pattern with meandering for several reasons. It may be regarded that the meandering of light causes non-uniform splitting of the light intensity at a branch point, resulting in a non-uniformity of optical losses over the port.

According to this embodiment, the meandering light propagating in the junction side core 111 toward the incident direction can be blocked.

Figure 5:
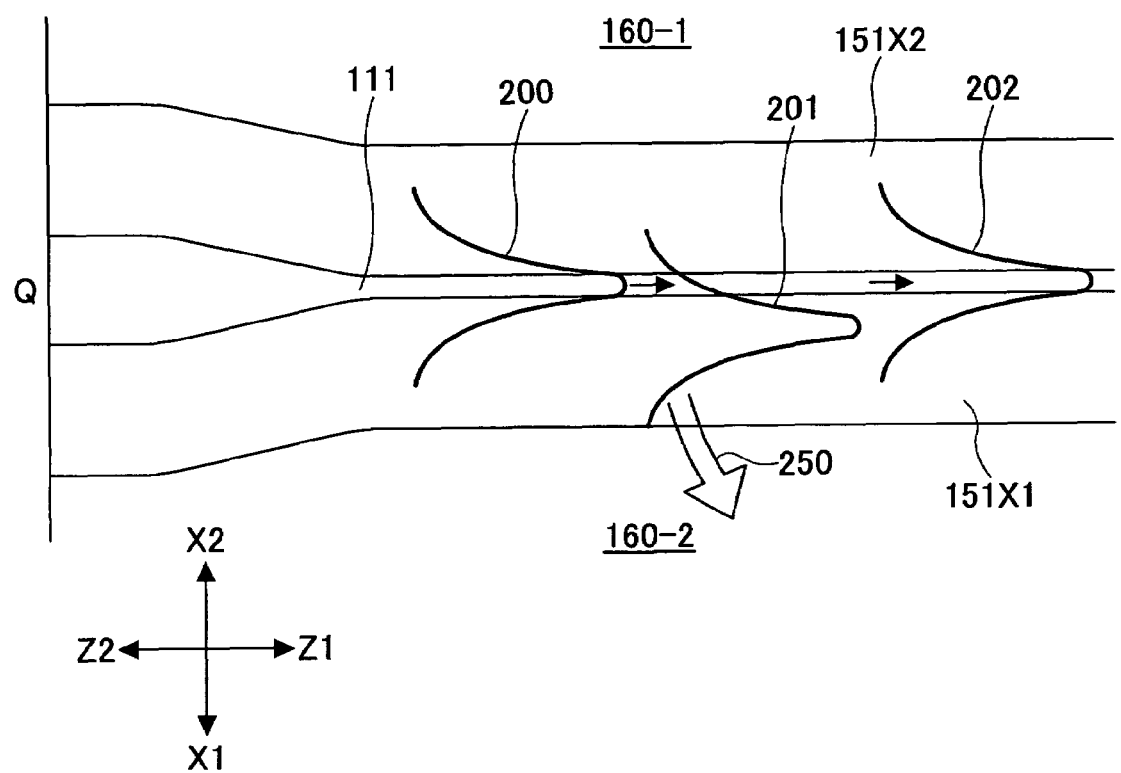
FIG. 5 is a drawing for explaining a correction principle for meandering of light propagating in a junction-side core.

FIG. 5 is an illustrative drawing to show a principle of compensating for the meandering light propagating in the junction side core 111 toward the light incident direction.

The light intensity is illustrated by a Gaussian-like shape. When light is propagating in the junction side core 111, a distribution tail of the light intensity runs over the band-shaped part 151X1 or 151X2.

FIG. 5 shows that the light 200 incident to the port Q starts propagating in the junction side core 111 and meanders toward the X1 direction. When the light 200 meanders and becomes the light 201, as indicated by an arrow 250, the intensity distribution tail of the light 201 on the X1 side is absorbed by the high refractive index region 160-2, and the intensity distribution of light 201 is forced to shift toward the X2 side. As the result, the center of the light intensity distribution 202 almost corresponds with that of the junction side core 111, so as to correct the meandering of light.

Figure 6:
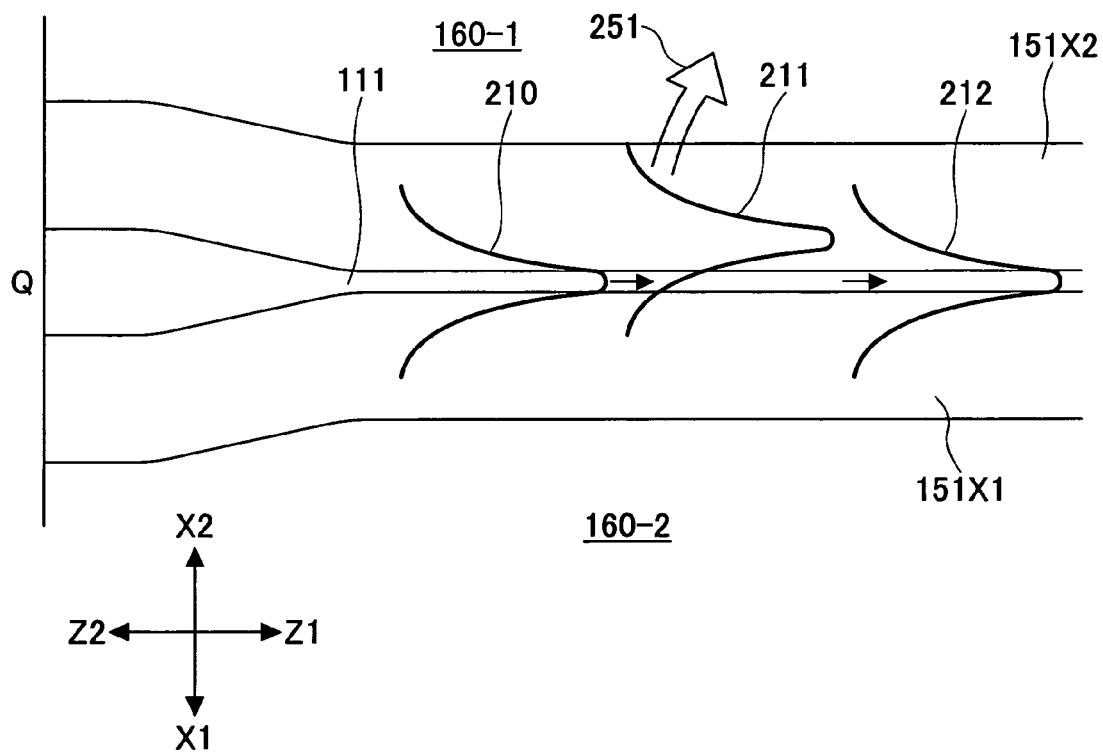
FIG. 6 is an illustrative drawing for explaining a correction mechanism of meandering light propagating in a junction-side core.

FIG. 6 is an illustrative drawing to show the principle of compensating for meandering light in which the light propagates toward the incident direction.

FIG. 6 shows that the light 210 incident to the port Q starts propagating in the junction side core 111 and meanders toward the X2 direction. When the light 210 meanders and becomes the light 211, as indicated by an arrow 251, the intensity distribution tail of the light 211 on the X2 side is absorbed by the high refractive index region 160-1, and the intensity distribution of light 211 is forced to shift toward X1 side and transferred. As a result, the center of the light intensity distribution 212 almost corresponds to that of the junction side core 111, in order to correct the meandering of light.

Thereby, at the end of the junction side core 111, the center of the intensity distribution of the light almost corresponds to the center of the junction side core 111, so that the non-uniformity of optical loss at the branch 102-1 is improved, and the light is equally split at the branch 102-1 and propagates into the first stage branch side cores 121 and 122.

The correction of meandering light is performed while the light propagates in each of the branch side cores 121, 122, 131 through 134, and 141 through 148. Thus, the light is equally split at the branches 102-2 through 102-7 and propagates into the individual branch side cores.

Thereby, the non-uniformity of optical losses at the output ports can be improved as described below.

In addition, as the meandering light is suppressed, the distance between the port Q and the branch 102-1 may be shortened.

Further the effect on the leak light blocking band 170 is explained in the following.

FIG. 7 is an illustrative drawing for explaining the effect on the leak light blocking band 170.

While the light propagates in the core, part of the light leaks out from the core to the outside at the branches 102-1 through 102-7. In FIG. 7, the arrows 300 and 301 indicate the light having leaked out from the core 111 at the first branch 102-1. The arrows of 302 and 303 indicate the light having leaked out from the core 121 at the next branch 102-2. Further, the arrows 304 and 305 indicate the light having leaked out from the core 122 at another branch 102-3. The leaked light advances in arbitrary directions and when the leaked light is introduced into a particular core of a branch side, the leaked light merges with the light propagating in that point of the particular core. The merged leak light becomes noise to the light propagating in the core, resulting in the intensity fluctuation of the propagating light.

In FIG. 7, as the leaked light 300, 302, 303, and 305 propagate toward outside of the core pattern 101, no problem occurs. However, in the case of the leaked light 303, the leaked light 303 travels across the upper cladding layer 150 and arrives at the high refractive index region 160-4. Then, the leaked light propagates toward the branch side core 133 through the high refractive index region 160-4, so that unnecessary merging of light may occur between the leaked light and the light propagating in the branch side core 133.

In this embodiment, the leak light blocking band 170 is provided, located across the high refractive index region 160-4. One end of the blocking band 170 is connected to the cladding belt 150 of the branch side core 132, and another end is connected to the upper cladding layer 150 of the branch side core 133. Thereby, the leaked light 303 is reflected by the blocking band 170-2 prior to reaching the branch side core 133. The reflected light 303 can be reflected by another blocking band 170-1 and is gradually absorbed while propagating in the high refractive index region 160-4. Thus, the leaked light 303 is blocked from merging with the light propagating in the-branch side core 133.

Similarly, the leaked light 304 propagates across the high refractive index region 160-4 toward the branch side core 132. The leaked light 304 is reflected by the blocking band 170-1 prior to arriving at the branch side core 133.

The reflected light 304 can be reflected by another blocking band 170-2 and is gradually absorbed while propagating in the high refractive index region 160-4. Thereby, the leaked light 304 is blocked from merging with the light propagating in the branch side core 132.

Specifically, at the branches 102-2 and 102-3, the leaked light propagating toward the branch side core 133 or 132 is blocked out by the leak light blocking band 170 and confined in the side of Z2, and the leak light is absorbed while propagating in the high refractive index region 160-4. As a result, the non-uniformity of losses at the output ports is improved.

Further, the leak light blocking band 170 may be omitted when necessary.

Figure 8:
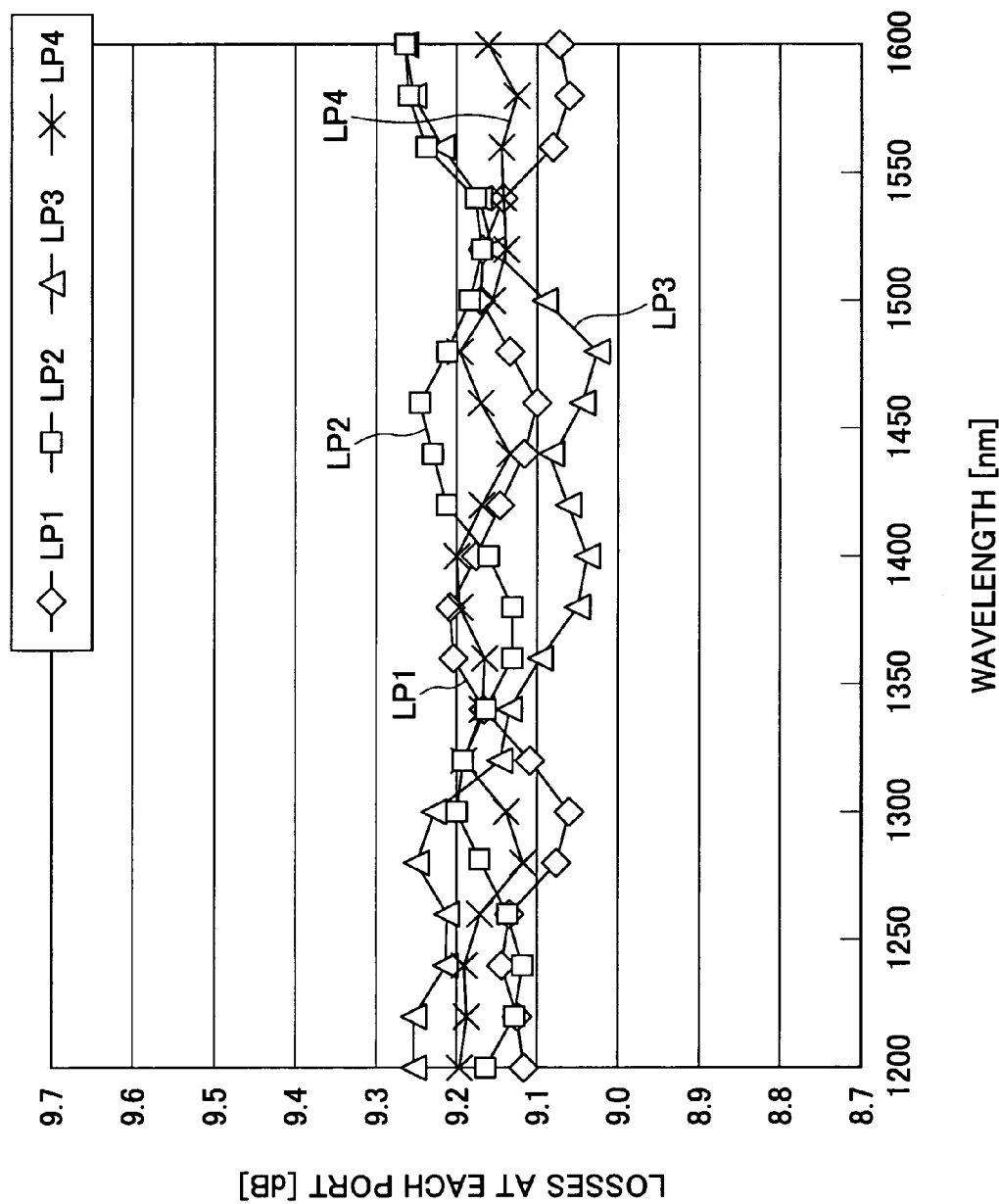
FIG. 8 is an illustrative drawing showing wavelength dependence of optical losses at the ports of an 8-branch optical waveguide device of FIG. 1.
Figure 9:
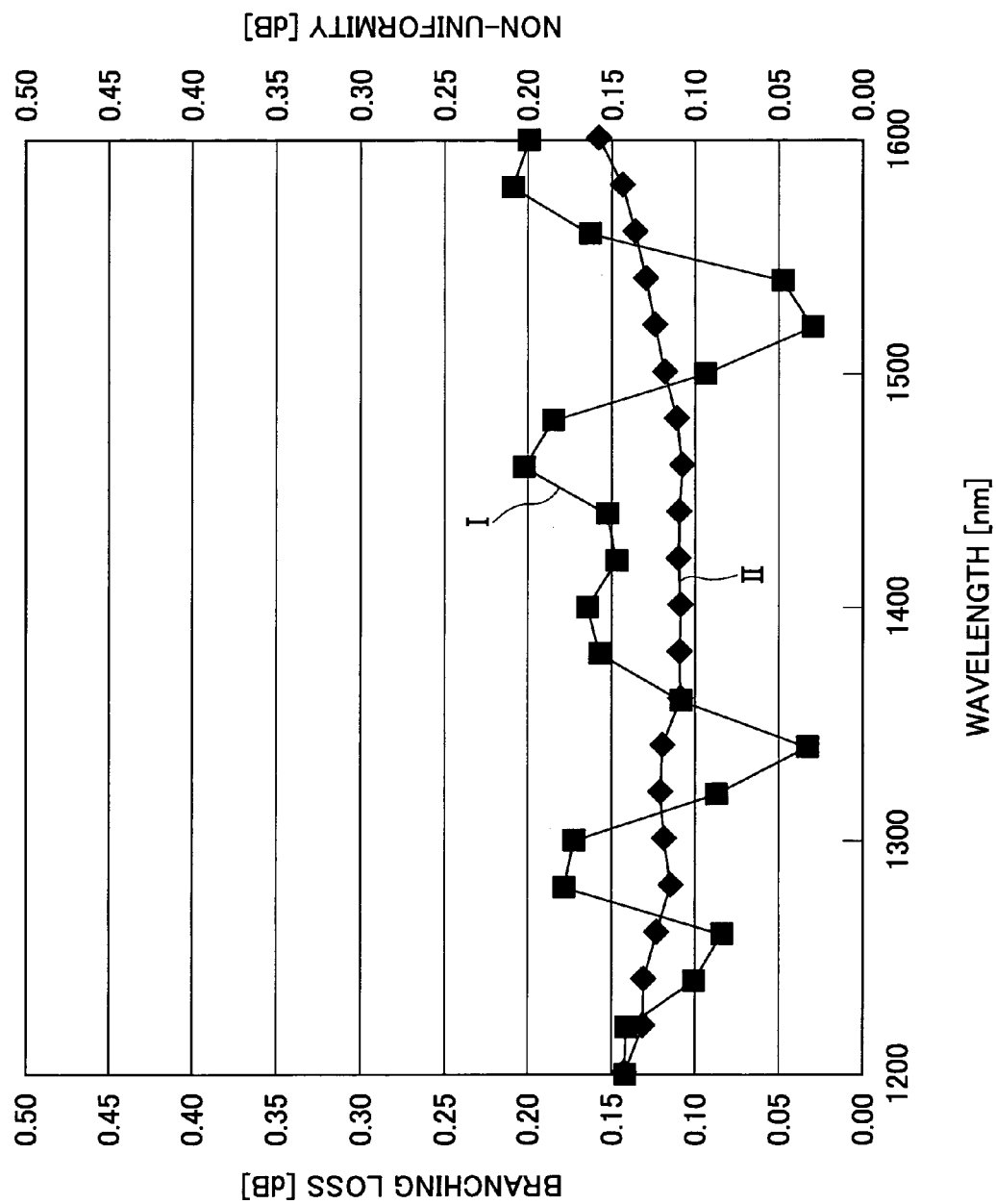
FIG. 9 is an illustrative drawing showing wavelength dependence of non-uniformity of optical losses at the ports of an 8-branch optical waveguide device of FIG. 1.

FIG. 8 and FIG. 9 are simulation results showing the characteristics of the 8-branch optical waveguide device 100.

FIG. 8 shows the wavelength dependence on losses of the ports P1 through P4.

The lines LP1 through LP4 represent the wavelength dependence on losses for each port P1 through P4. For the ports P5 through P8, their characteristics are similar to those of the ports P1 through P4.

Figure 11:
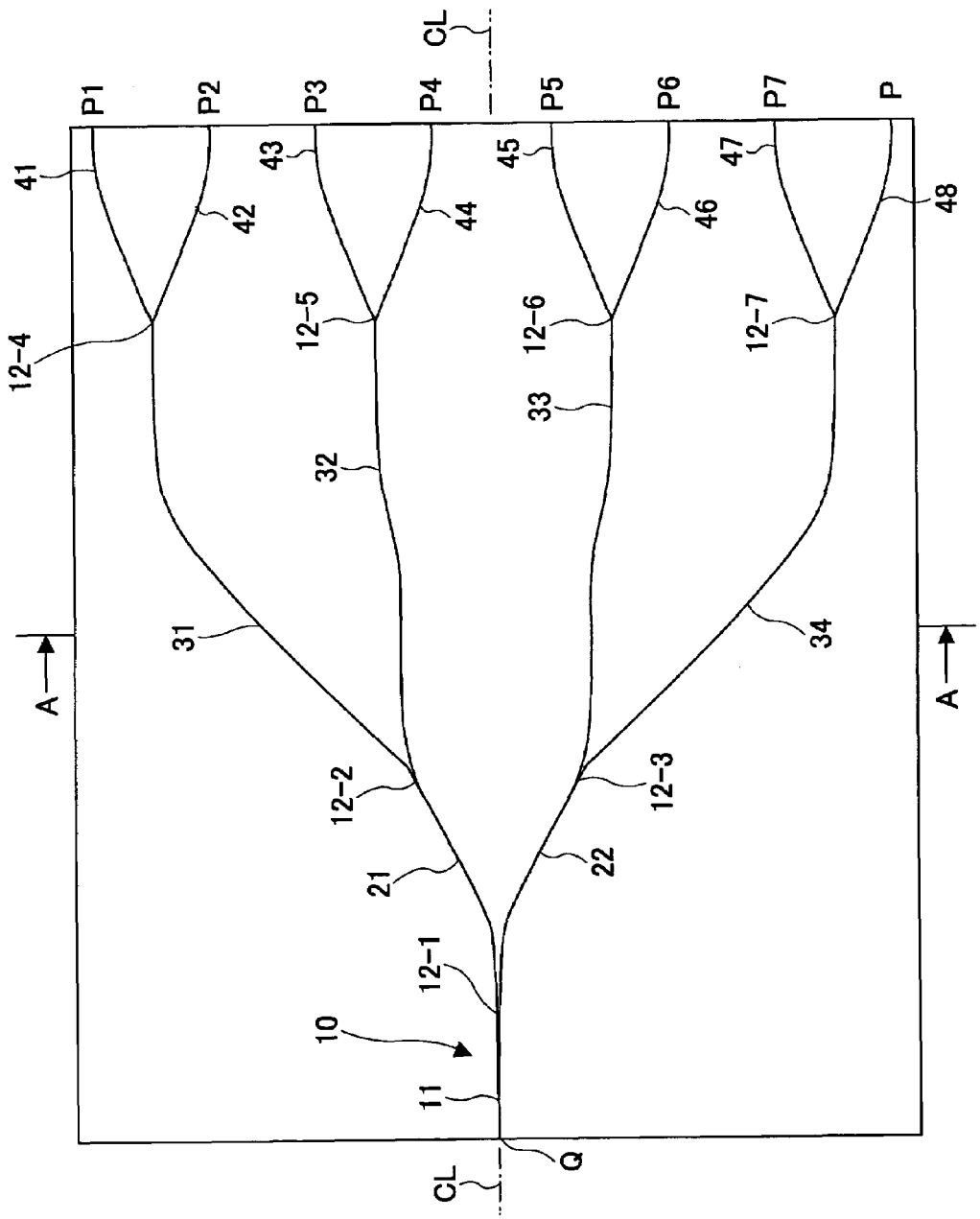
FIG. 11 is a plan view of a conventional 8-branch optical waveguide device.
Figure 12:
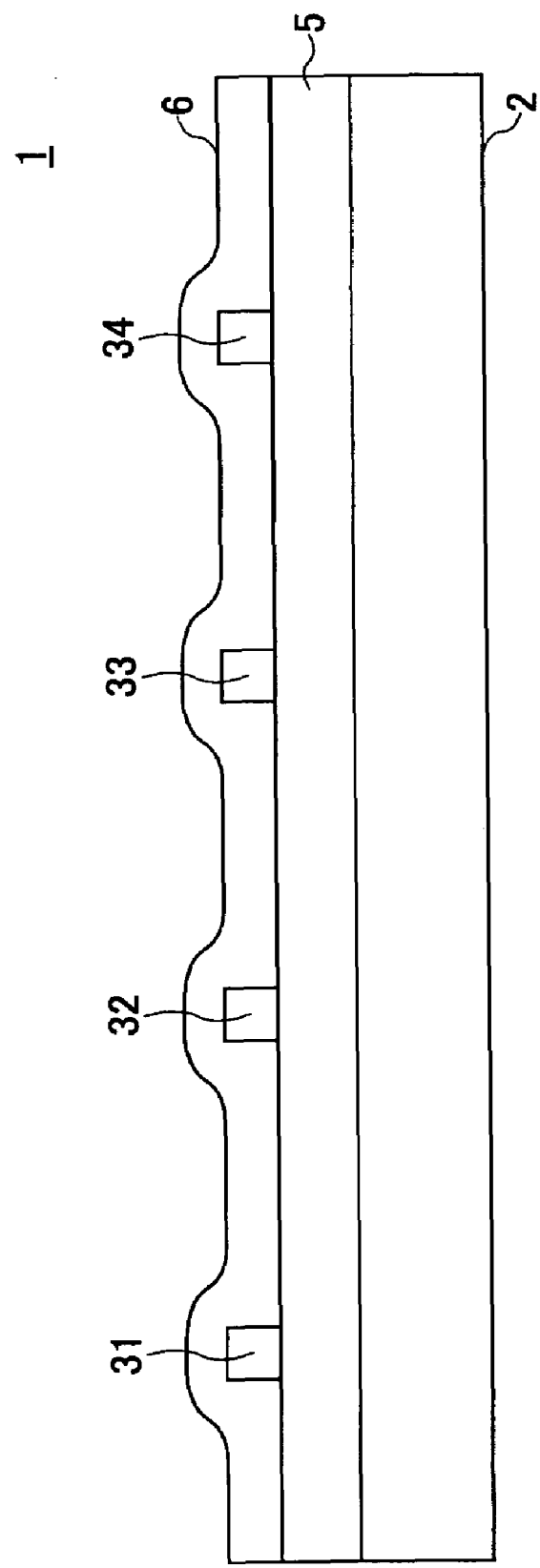
FIG. 12 is an enlarged cross-sectional view at the line A-A in FIG. 11.
Figure 13:
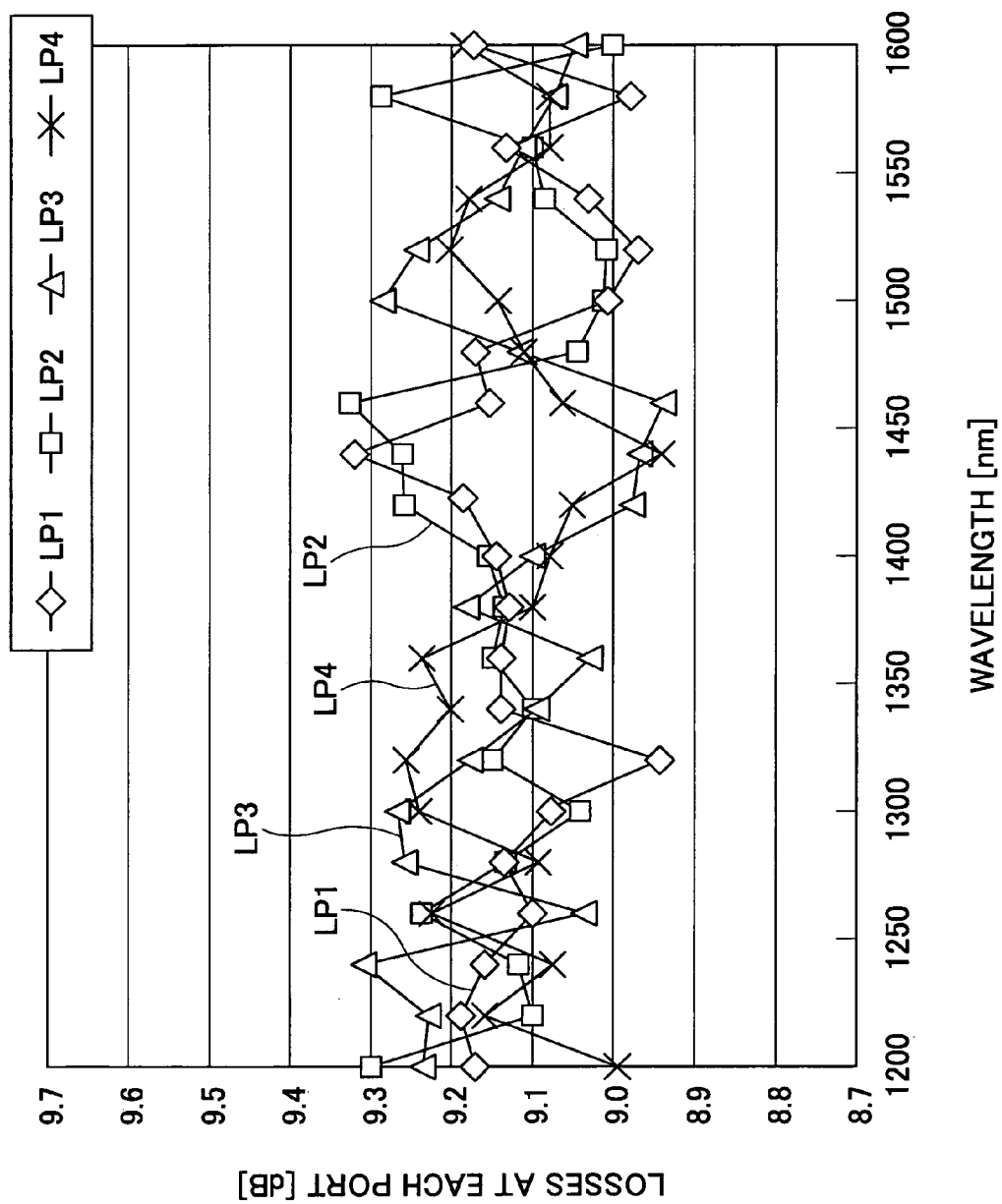
FIG. 13 is an illustrative drawing showing a wavelength dependence on losses at ports of a conventional 8-branch optical waveguide device in FIG. 11.

It is seen that the fluctuations of losses as a function of wavelength for the individual ports in FIG. 8 become smaller compared to the conventional case in FIG. 11.

FIG. 9 shows a non-uniformity of port losses as a function of wavelength (line I) and branching losses as a function of wavelength (line II). The non-uniformity of losses at a port is expressed by the difference of the maximum loss and the minimum loss for a particular port.

Figure 14:
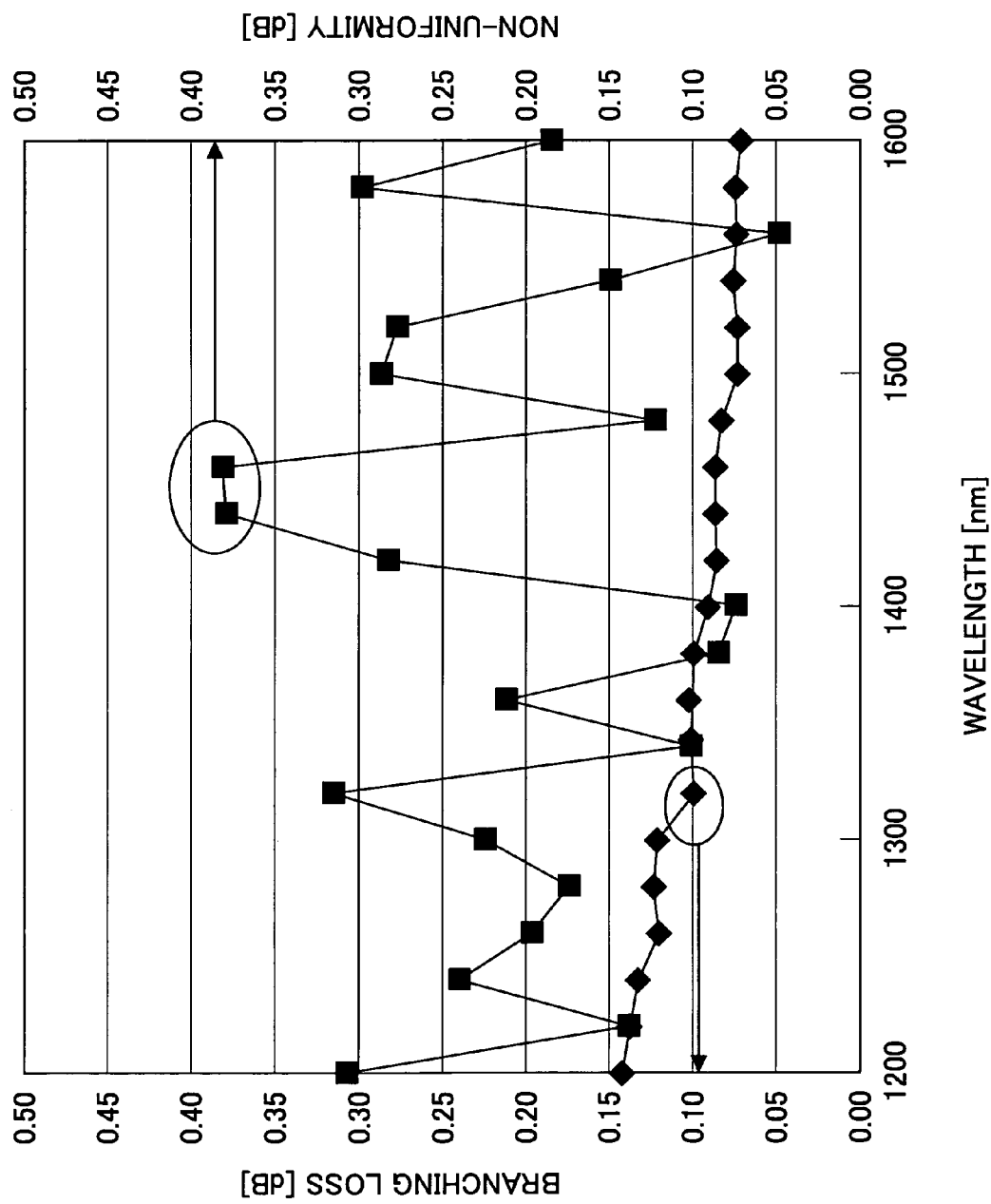
FIG. 14 is an illustrative drawing showing a wavelength dependence on non-uniformities of losses at ports of a conventional 8-branch optical waveguide device in FIG. 11.

FIG. 9 shows that the difference of the losses at a port is 0.2 dB in the maximum case for this embodiment, which is smaller than that of the conventional case, 0.37 dB, in FIG. 14.

The branching losses at branches are comparable to those of the conventional case, as indicated by the line II in FIG. 9.

In the following, the fabrication method of the 8-branch optical waveguide device 100 is described.

An 8-branch optical waveguide device 100 is fabricated on a silicon substrate, similar to a conventional method. By using the multilayer film formation and lithography techniques, plural 8-branch optical waveguide devices are fabricated on a silicon substrate in matrixes. After fabrication of the plural 8-branch optical waveguide devices, the silicon-substrate is scribed to make unit chips as the final step.

Figure 10:
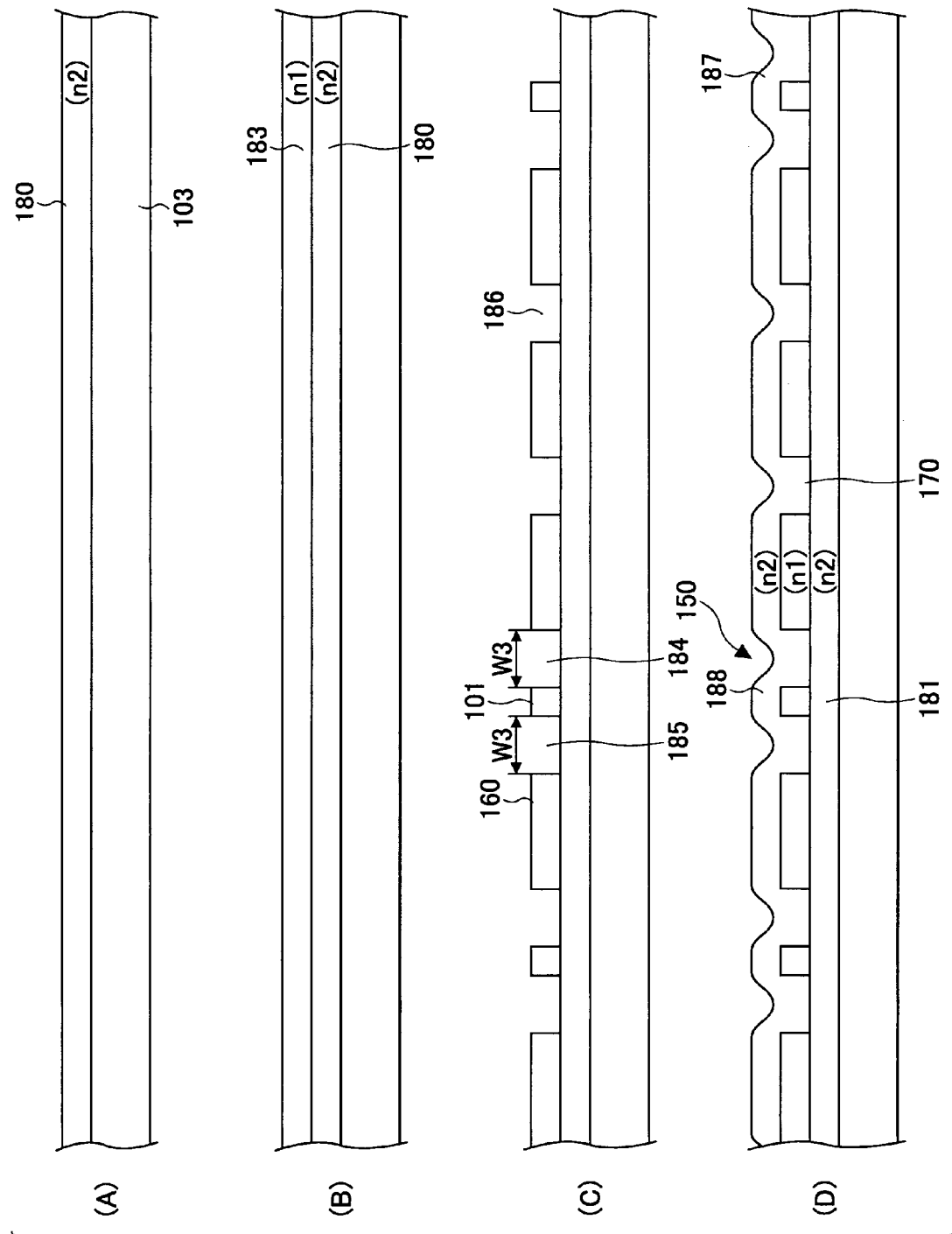
FIG. 10 is an illustrative drawing showing a fabrication process of an 8-branch optical waveguide device of FIG. 1.

FIG. 10 shows a cross-sectional view of the 8-branch optical waveguide device 100 and its fabrication method according to this embodiment, showing the same cross-sectional part as in FIG. 4.

First, a fluorinated polyimide resin film 180 with a refractive index n2 is formed on a silicon substrate 103, as shown in FIG. 10(A). The fluorinated polyimide resin film 180 is used for a lower cladding layer 181 at the end of the process.

Next, a fluorinated polyimide resin film 183 with a refractive index n1 is formed on the fluorinated polyimide resin film 180, as shown in FIG. 10(B). The fluorinated polyimide resin film 183 is used for a core pattern 101 and a high refractive index region 160 at the end of the process.

Next, as shown in FIG. 10(C), by using a mask part (not shown), a resist mask (not shown) is formed on the fluorinated polyimide resin film 183, and the fluorinated polyimide resin film 183 is etched by a dry etching technique using reactive ion etching (RIE) equipment. As a result the trenches 184, 185 with widths of W3 are formed, where the trenches sandwich the core pattern 101 on both sides of the core pattern 101, and the trenches are laid according to the core pattern 101. Further, a trench 186 is formed to provide the leak light blocking band 170. After the trenches 184 and 185 are formed, the area between the trenches 184, 185 becomes the core pattern 101, and the rest of the part, that is, the area outside of the trenches 184, 185 becomes the high refractive index region 160. In the process, only the band-shaped part, a narrow and shallow area is etched by dry etching, and, thus, the dry etching process can be performed effectively. Also, the high refractive index region 160 is formed at the same time that the core pattern 101 is formed on the silicon substrate 103. There is no additional process to form the high refractive index region 160.

Next, as shown in FIG. 10(D), a fluorinated polyimide resin film 187 with a refractive index n2 is formed. The fluorinated polyimide resin film 187 covers the core pattern 101, fills in the trenches 184, 185, covers the high refractive index region 160, and fills in the trench 186. The part of the fluorinated polyimide resin film 187 covering the core pattern 101 and filling the trenches 184, 185, becomes a cladding layer 188. Another part of the fluorinated polyimide resin film 187 filling the trench 186 becomes the leak light blocking band 170.

The core pattern 101 is sandwiched by the lower cladding layer 181 and the upper cladding layer 188, so that an optical waveguide is formed. The upper cladding layer 188 and the lower cladding layer 181 form the upper cladding layer 150.

[Modification]

The following describes a modification of the embodiment according to the present invention.

The high refractive index area may be formed partially on the rest of the area. For example, in FIG. 1, the high refractive index area may be formed without the high refractive index region for the upper part of the high refractive index region 160-1 and the lower part of the high refractive index region 160-2. The high refractive index region 160 may be formed only along the band-shaped part 151X1 and the band-shaped part 151X2.

The shape of the leak light blocking band 170 may be approximately U-shaped toward the input port Q. Further, the leak light blocking band 170 may be filled with a polyimide resin film that is not fluorinated. In this case, the leaked lights 303 and 304 can be absorbed where each light arrives at the leak propagation blocking band 170.

Further, the present invention can be applied to optical waveguide devices that have no branches.

While the preferable embodiments of the present invention have been described above, the present invention is not limited to these embodiments, and any modification for the present invention belongs to the present invention as long as it is within the scope of the present invention.

The present application is based on and claims the benefit of a Japanese Patent Application No. 2005-289099 filed Sep. 30, 2005, the disclosure of which is hereby incorporated by reference.

What is claimed is:

1. An optical waveguide device comprising:
   a lower cladding layer;
   a high refractive index region provided on the lower cladding layer;
   a pair of cores provided on the lower cladding layer on both sides of the high refractive index region;
   an upper cladding layer provided on the high refractive index region and the pair of cores; and
   a leak light blocking band traversing the high refractive index region and having each end connected to one of a pair of band-shaped parts adjacent to the pair of cores;
   wherein one of the upper and lower cladding layers has the band-shaped parts disposed between the high refractive index region and the pair of cores, the upper and lower cladding layers have a refractive index n2, the high refractive region has a refractive index n3 satisfying a relationship n3>n2, and a refractive index of the leak light blocking band is smaller than a refractive index of the pair of cores.

2. The optical waveguide device as claimed in claim 1, wherein each of the pair of cores has a refractive index n1 satisfying a relationship n3≧n1>n2.

3. The optical waveguide device as claimed in claim 1, wherein the leak light blocking band extends in an approximate V-shape or an approximate U-shape which opens toward an input end from which light enters the pair of cores.

4. An optical waveguide device comprising:
   a lower cladding layer having a second refractive index n2;
   a core having a first refractive index n1 and provided on the lower cladding layer;
   a high refractive index region having a third refractive index n3 and provided on the lower cladding layer; and
   an upper cladding layer having the second refractive index and covering the core,
   wherein one of the upper and lower cladding layers has a band-shaped part disposed between the core and the high refractive index region, and
   the first, second and third refractive indexes n1, n2 and n3 satisfy a relationship n3≧n1>n2.

5. The optical waveguide device as claimed in claim 4, wherein the band-shaped part and the high refractive index region extend along the core.

6. The optical waveguide device as claimed in claim 5, wherein the band-shaped part and the high refractive index region are located on both sides of the core, so that the core is sandwiched between two adjacent high refractive index regions via two adjacent band-shaped parts.

7. The optical waveguide as claimed in claim 4, further comprising:
   an input port;
   at least two output ports;
   at least one stage where an optical path branches to two optical paths, provided between the input port and the output ports; and
   a leak light blocking band,
   wherein the core extends from the input port and branches at said stage towards the output ports, and
   the leak light blocking band traverses the high refractive index region so that each end of the leak light blocking band connects to the band-shaped part which is adjacent to one of the two optical paths.

8. The optical waveguide as claimed in claim 7, wherein the leak light blocking band extends in an approximate V-shape or an approximate U-shape which opens toward the input port.

* * * * *